United States Patent [19]
Killian

[11] Patent Number: 6,163,316
[45] Date of Patent: Dec. 19, 2000

[54] ELECTRONIC PROGRAMMING SYSTEM AND METHOD

[75] Inventor: Robert T. Killian, Richardson, Tex.

[73] Assignee: Texas Instruments Incorporated, Dallas, Tex.

[21] Appl. No.: 08/943,661

[22] Filed: Oct. 3, 1997

Related U.S. Application Data

[60] Provisional application No. 60/034,480, Jan. 3, 1997.

[51] Int. Cl.[7] ...................................................... H04N 7/10
[52] U.S. Cl. .......................... 345/327; 348/565; 348/553; 348/908
[58] Field of Search ............................... 348/6, 7, 12, 13, 348/906, 553, 563, 564, 560, 570; 345/327; H04N 5/445

[56] References Cited

U.S. PATENT DOCUMENTS

| | | | |
|---|---|---|---|
| 4,706,121 | 11/1987 | Young | 358/142 |
| 4,977,455 | 12/1990 | Young | 358/142 |
| 5,223,924 | 6/1993 | Strubbe . | |
| 5,353,121 | 10/1994 | Young et al. | 348/563 |
| 5,465,113 | 11/1995 | Gilboy | 348/906 X |
| 5,479,266 | 12/1995 | Young et al. | 358/335 |
| 5,479,268 | 12/1995 | Young et al. | 358/335 |
| 5,517,254 | 5/1996 | Monta et al. | 348/569 |
| 5,532,754 | 7/1996 | Young et al. | 348/569 |
| 5,550,575 | 8/1996 | West et al. | 348/5.5 |
| 5,550,576 | 8/1996 | Klosterman | 348/6 |

FOREIGN PATENT DOCUMENTS

| | | |
|---|---|---|
| 0 682 452 A2 | 11/1995 | European Pat. Off. . |
| 0 721 253 A2 | 7/1996 | European Pat. Off. . |
| 0 777 385 A2 | 6/1997 | European Pat. Off. . |
| WO 94/13107 | 6/1994 | WIPO . |
| WO 94/14284 | 6/1994 | WIPO . |
| WO 96/17467 | 6/1996 | WIPO . |
| WO 97/13368 | 4/1997 | WIPO . |
| WO 97/33434 | 9/1997 | WIPO . |
| WO 97/41690 | 11/1997 | WIPO . |

OTHER PUBLICATIONS

"Electronic Program Guide Via Internet" *Research Disclosure*, May 1996, p. 276.

"How and why people watch TV: implications for the future of interactive television," by Barbara Lee and Robert S. Lee, Journal of Advertising Research, Nov.–Dec. 1995, v35 n6 p. 9.

"StarSight: An Introduction," StarSight Telecast, Inc., Internet document generated Sep. 9, 1996.

"The GIST makes its Web debut with the new FALL TV season/a fresh way to view televison & the Internet www.TheGIST.com," NewsPage, Internet document generated Sep. 12, 1996.

"TV1," Grid Listings, Internet document generated Sep. 13, 1996.

*Primary Examiner*—Nathan Flynn
*Attorney, Agent, or Firm*—Robert L. Troike; Frederick J. Telecky, Jr.

[57] ABSTRACT

An electronic programming guide (70) operates on a computing platform (12) associated with a television (40). The platform (12) accesses a program listing database (48) containing program listing information (6) for a plurality of television programs. The electronic programming guide (70) includes a profile database (80) that stores a viewer profile (84) and a suggest module (76) that is coupled to the profile database (80). The suggest module (76) accesses the viewer profile (84) and the program listing information (6) and, in response, generates a preferred schedule (100) according to the viewer profile (84) and the program listing information (6). The preferred schedule (100) indicates the desirability of a particular program relative to other programs. The electronic programming guide (70) may also be used to instruct a recorder (20) to record a television program in accordance with the program listing information (6) and viewer input information that does not specify broadcast information concerning the program.

2 Claims, 5 Drawing Sheets

U.S. PATENT DOCUMENTS

| | | |
|---|---|---|
| 5,585,866 | 12/1996 | Miller et al. . |
| 5,594,509 | 1/1997 | Florin et al. .................. 348/734 X |
| 5,657,072 | 8/1997 | Aristides et al. .................. 348/906 |
| 5,699,107 | 12/1997 | Lawler et al. ...................... 348/906 X |
| 5,758,259 | 5/1998 | Lawler ................................ 348/906 X |
| 5,781,246 | 7/1998 | Alten et al. .............................. 348/731 |

ELECTRONIC PROGRAMMING SYSTEM AND METHOD

This application is a continuation of Provisional Application 60/034,480 filed on Jan. 3, 1997.

TECHNICAL FIELD OF THE INVENTION

This invention relates in general to the field of television viewing and recording, and more particularly to an electronic programming system and method.

BACKGROUND OF THE INVENTION

Many television viewers wish to select, schedule, and record their television viewing opportunities to enhance the television viewing experience. To do this, many select programs for viewing after consulting a paper or electronic programming schedule to determine the programs available during particular time slots. Others change from channel to channel in an attempt to locate desirable programming, with varying degrees of success.

As the number of television channels and television programs continues to increase, allowing viewers to more intelligently select, schedule, and record their viewing opportunities becomes increasingly important. An existing technique for electronically accessing program scheduling information includes periodically downloading scheduling information and, in response to requests from the viewer, providing this scheduling information in raw form to the viewer. Even though such techniques may allow the viewer to display only programs of a particular genre, the viewer must still either inspect listing information for programs individually to make informed channel and program choices or waste time "channel surfing" through the programs that are displayed. Because such techniques do not provide any direct channel tuning assistance, they are inadequate to meet the needs of many viewers. Moreover, prior techniques do not allow the viewer to restrict viewing of particular programs or programs having particular characteristics to certain viewers within the household, such as children, without first inspecting a program schedule to determine broadcast information for the programs, such as air dates, start times, stop times, and channels.

Furthermore, electronic program guide (EPG) displays that consider viewer preference information are subject to error, require the viewer to have some understanding of the particular scoring algorithm used, are confusing to viewers that change from one EPG to another EPG, and do not allow for identification of preferred program clustering, which severely limit the ability to accurately and efficiently plan quality viewing time. In addition, prior techniques for recording programs require viewers to input detailed broadcast information, such as air dates, start times, stop times, and channels, or special program codes to record particular programs, are subject to error if a program to be recorded is longer than usual or expected, is preempted, is rescheduled, is changed from one channel to another channel, or otherwise varies from the expectations of the viewer in any manner, and do not allow viewers to record particular programs or types of programs that the viewers are most likely to enjoy based on viewer preferences or other input information that does not specify broadcast information for the programs. These and other inadequacies make prior techniques unsuitable for many viewers.

SUMMARY OF THE INVENTION

The present invention addresses the disadvantages and problems previously associated with television viewing and recording.

According to one embodiment of the present invention, an electronic programming guide operates on a computing platform that is associated with a television. The platform accesses a program listing database containing program listing information for a plurality of television programs. The electronic programming guide includes a profile database that stores a viewer profile and a suggest module that is coupled to the profile database. The suggest module accesses the viewer profile and the program listing information and, in response, generates a preferred schedule according to the viewer profile and the program listing information. The preferred schedule indicates the desirability of a particular program relative to other programs.

In another embodiment of the present invention, a method for recording a television program is performed on a computing platform associated with a television and a recorder. Viewer input information is received that does not specify broadcast information concerning the program. Program listing information for a plurality of programs is stored in a program listing database coupled to the platform. The program listing information is accessed and compared to the input information to generate recording information for the program according to the comparison. The recording information for the program is communicated to the recorder to instruct the recorder to record the program.

The electronic programming system and method of the present invention provides a number of important technical advantages. The present invention generates profiles for one or more viewers that are used to score all available programming to determine which programs are most likely to appeal to the viewers. The resulting information is then provided in a simple and understandable format that allows the viewers to more intelligently select, schedule, and record viewing opportunities without inspecting broadcast information for particular programs. The program-based nature of the present invention allows the viewer to tune to more desirable programming at any time during a viewing session and to record particular types of programs at any time before, during, or after a viewing session according to the viewer preference information used to establish the viewer profile. Furthermore, viewers need not block entire channels to restrict viewing of undesirable programs to certain viewers within the household, such as children. In addition, the present invention allows viewers to record particular programs without providing or even having access to broadcast information such as air dates, start times, stop times, and channels. Other technical advantages are readily apparent to one skilled in the art from the following figures, description, and claims.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
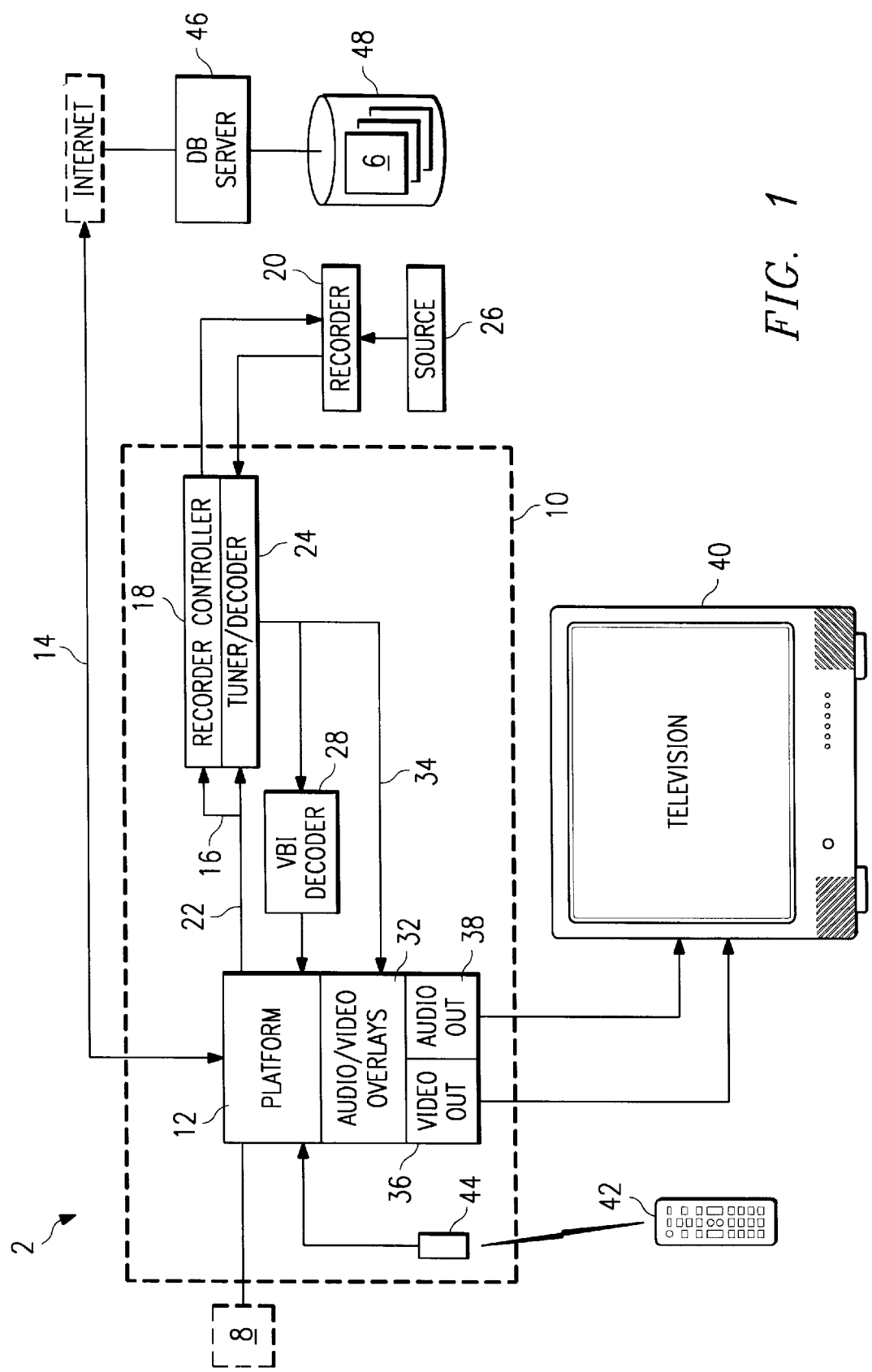
FIG. 1 illustrates a JAVA-enabled television system according to the present invention.

FIG. 1 illustrates a JAVA-enabled television system 2 that includes a JAVA-enabled television receiver 10 that is associated with a television or other suitable display device 40 and a recorder 20, such as a video cassette recorder (VCR), video disk recorder, or other recording device suitable to record video and audio television signals. Receiver 10 includes a JAVA-based platform 12 that operates on one or more processors 8, such as a digital signal processor (DSP) chip manufactured by TEXAS INSTRUMENTS INCORPORATED, an advanced reduced instruction set computer (RISC) machine (ARM), or any other suitable processing platform. Platform 12 is coupled to the Internet and associated sources of Internet information using a bidirectional link 14. In general, platform 12 provides a collection of application programming interfaces (APIs) that allow platform 12 to synchronize and integrate television signals and Internet information for display on television 40, to support JAVA applets or applications that provide interactive television programming, and to support JAVA applets or applications that provide a wide variety of functionalities related to television programming. In one embodiment, as discussed more fully below with reference to FIG. 3, platform 12 supports an electronic programming guide JAVA applet or application that allows viewers to more intelligently select, schedule, and record viewing opportunities according to viewer profiles and information received using link 14. The structure of platform 12 is discussed more fully below with reference to FIG. 2. Although JAVA is discussed, any other platform independent programming language or other suitable programming language may be used without departing from the intended scope of the present invention.

Link 14 may be any dedicated or switched connection to a public switch telephone network (PSTN), an integrated services digital network (ISDN), a coaxial cable network, a satellite or microwave link, or any other wireless or wireline communications link suitable to couple platform 12 to the Internet. Although the Internet is discussed, the present invention contemplates any global, regional, local, or other suitable computer network coupled to platform 12. Database server 46 coupled to the Internet accesses program listing database 48, which contains television programming information that is periodically updated according to the operation of an organization associated in some manner with server 46 and database 48. In one embodiment, database 48 contains program listing information 6 for each program available for viewing within the next day, week, month, or other specified period from television signal source 26, which may be any suitable cable television system (CATV), direct broadcast satellite system (DBS), regular satellite broadcast system, conventional television broadcast system, or other suitable system for providing television signals to receiver 10.

For each program for which database 48 has listing information, program listing information 6 may include, without limitation: program dates; start times; stop times; a program length; program channels; program genres; a list of actors for the program; a list of sports teams to which the program may relate in some manner; keywords associated with the program that describe the program in some manner; a synopsis of the program; whether the program is a rerun, premiere, finale, miniseries, movie, special, or any other type of program; whether the program is a closed-captioned program; whether the program is in stereo; a Motion Picture Association of America (MPAA) rating or other rating for the program; content information concerning nudity, adult situations, adult language, violence, or other any other type of content; and any other appropriate program listing information 6. An electronic programming guide (EPG) JAVA applet or application running on platform 12 periodically accesses database 48 using link 14 and server 46 to receive program listing information 6 that allows the EPG applet or application to provide television-related functionalities to viewers associated with receiver 10 and television 40, as discussed more fully below with reference to FIG. 3. Although database 48 is discussed, the present invention contemplates a suitable database integral to receiver 10 and periodically updated by one or more service providers external to receiver 10 using link 14, for example, daily, weekly, or on any other periodic basis, to include program listing information 6 accessible to platform 12.

Receiver 10 includes one or more tuner/decoders 24 that couple to platform 12 using tuner/decoder control line 22 and receive television signals from source 26, either directly or through recorder 20. Recorder control line 16 couples platform 12 to recorder controller 18 that controls recorder 20 according to the operation of platform 12. One or more audio/video overlays 32 are coupled to platform 12 and coordinate the integration of television signals and Internet information in accordance with the operation of platform 12. A vertical blanking interval (VBI) decoder 28 coupled to tuner/decoder 24 receives decoded television signals from tuner/decoder 24, separates information from the VBI from the decoded television signals, for example, Intercast, closed-captioning, Teletext, or any other VBI information, and communicates the separated VBI information to platform 12. Tuner/decoder 24 also communicates the decoded television signals to audio/video overlays 32 using television line 34. Audio/video overlays 32 communicate outputs to video output 36 and audio output 38.

In one embodiment, video output 36 is a super video (S-video) output with RCA jack cable support or any other suitable video output. Audio output 38 may support any suitable combination of mono, stereo, surround, or other audio information. Video output 36 and audio output 38 are coupled to television 40, although the present invention contemplates video output 36 and audio output 38 integral to television 40 in accordance with the design of receiver 10 and system 2. Input device 42 includes a remote control touch screen, mouse, keypad, or other suitable pointer to communicate infrared, electronic, or other input signals to input receiver 44 of receiver 10. Components of receiver 10 may be at one or more locations integral to or separate from television 40, such as a set top box, a network computer or other processing device, or any other component coupled to television 40.

In operation of system 2, tuner/decoder 24 receives a television signal from source 26, either directly or using recorder 20, and decodes the television signal as necessary or appropriate. In one embodiment, multiple tuner/decoders 24 are used to provide images suitable for a television picture display. Before, during, or after tuner/decoder 24 receives the television signal from source 26, a viewer associated with television 40 selects a particular channel for viewing, using input device 42 or in any other suitable manner. Tuner/decoder 24 communicates a decoded television signal corresponding to the selected channel to audio/video overlays 32 and VBI decoder 28, which in turn communicates the separated VBI information to platform 12. More or less simultaneously, platform 12 receives Internet information using link 14 for integration with the decoded television signal according to a JAVA applet or application operating on platform 12. Also operating on platform 12 is an electronic programming guide JAVA applet or application that provides various functionalities that allow viewers to more intelligently select, schedule, and record viewing opportunities according to viewer profiles and information retrieved from database 48, as discussed more fully below with reference to FIG. 3.

Platform 12 contains channel mapping information that associates the television signal for each channel with one or more uniform resource locators (URLs) used for accessing Internet information corresponding to the channel. For example, if the viewer selects the CABLE NEWS NETWORK (CNN) for viewing, platform 12 might use the channel mapping information to associate the channel carrying CNN with a URL for an Internet web site associated with CNN, such as http://www.cnn.com. Using the URL and other appropriate information, platform 12 retrieves the associated web page using Internet link 14. Audio/video overlays 32 integrate the web page, any appropriate VBI information received from VBI decoder 28, and the television signal for the selected channel received from tuner/decoder 24 according to the JAVA applet or application operating on platform 12 that controls the integration of this information. Audio/video overlays 32 then communicate the integrated information to television 40 using video output 36 and audio output 38 for viewing.

Typical integration of television signals and Internet information might result visually as the regular television broadcast in a first display area on television 40 and the Internet information in a second display area on television 40. In one embodiment, platform 12 allows the first and second display areas to be moved, sized, merged, blended, overlayed, or manipulated according to the corresponding JAVA applet or application to provide more sophisticated collective displays than were possible using prior systems. The present invention contemplates communicating a URL or other Internet information corresponding to a channel from source 26 using the VBI associated with the particular television signal for the channel. VBI decoder 24 would decode and communicate this information to platform 12, which would then access the appropriate URL using Internet link 14 to retrieve Internet information for integration with the television signal. Other suitable arrangements for obtaining a URL or other information necessary to allow platform 12 to integrate television signals and Internet information are contemplated, without departing from the intended scope of the present invention.

Since the web page that platform 12 accesses using the URL and integrates with the television signals for the corresponding channel may provide information relating to the subject matter of the television program, the viewer is able to interact with one medium to conveniently access a great deal of information concerning a topic. In addition, the Internet information that platform 12 synchronizes and integrates with the corresponding television signals may include information regarding other related web sites, an associated chat room in which the viewer might discuss the program with other viewers during the program, or any other Internet information. During a commercial break in the program, information regarding the advertised product might be retrieved from a web site associated with the product and synchronously and integrally displayed along with the commercial. In addition, as discussed more fully below with reference to FIG. 3, platform 12 supports a JAVA-based electronic programming guide (EPG) that allows one or more viewers to more intelligently select, schedule, or record viewing opportunities according to viewer profiles and program listing information 6 to enhance the television viewing experience.

Figure 2:
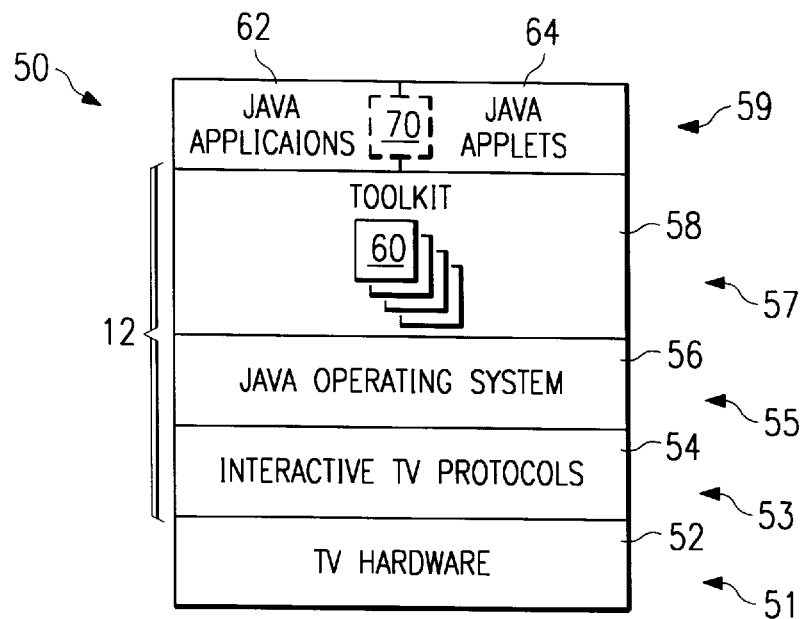
FIG. 2 illustrates a JAVA-based operating hierarchy according to the present invention.

FIG. 2 illustrates an exemplary JAVA-based operating hierarchy 50 for system 2 and platform 12 that includes a number of levels, each containing a collection of hardware, software, or both hardware and software suitable to perform the functions of system 2 and platform 12. First level 51 includes conventional television-related hardware 52, such as recorder controller 18, tuner/decoder 24, VBI decoder 28, video output 36, audio output 38, input receiver 44, and any other suitable hardware and software associated with receiver 10, recorder 20, and television 40. Second level 53 of hierarchy 50 includes one or more interactive television protocols 54, for example, Digital Audio/Video Interactive Decoder (DAVID) and Interactive Communications Applications Protocol (ICAP). Third level 55 of hierarchy 50 includes a basic JAVA operating system 56 with JAVA RUN-TIME, which implements the JAVA VIRTUAL MACHINE to provide various low level JAVA capabilities such as windowing, networking, and file management, together with appropriate JAVA extensions that augment basic JAVA APIs and associated classes according to the functionalities associated with platform 12. One such functionality, as discussed more fully below, is supporting an electronic programming guide JAVA applet or application that allows viewers to select, schedule, and record viewing opportunities according to viewer profiles and program listing information 6 retrieved from database 48.

Fourth level 57 includes a JAVA toolkit 58 having a collection of APIs 60 that cooperate with JAVA operating system 56 to allow JAVA applets 64 and applications 62 in fifth level 59 to perform functionalities associated with JAVA applets 64 and applications 62. In one embodiment, APIs 60 of toolkit 58 allow platform 12 to support JAVA applets 64 downloaded from the Internet over link 14, JAVA applications 62 installed locally on receiver 10 or any processing platform associated with receiver 10, or any other appropriate JAVA program that uses the television-related functionalities of APIs 60. Since toolkit 58 and APIs 60 are designed to support any appropriate JAVA applet 64 or application 62, the viewer is not limited to applets 64 or applications 62 from particular content developers, but may download any JAVA applet 64 or install any JAVA application 62 that provides the desired functionality without concern regarding compatibility with platform 12. Furthermore, toolkit 58 allows developers to write applets 64 and applications 62 that presume an ability on the part of platform 12 to integrate television signals and Internet information, to provide interactive television programming, to allow viewers to more intelligently select, schedule, or record viewing opportunities according to viewer profiles and program listing information 6, and to support any other suitable television-related functionality.

In one embodiment, each API 60 includes a collection of JAVA functions and supporting classes that are related to a particular task or combination of associated tasks and extend the basic JAVA APIs discussed above. For example, a control API 60 contains classes that support functions to integrate television signals into JAVA applets 64 and applications 62 as discussed above. Control API 60 also includes classes that control video and audio properties associated with television 40, for example, and not by way of limitation: controlling television overlay operations, such as color overlay keying to overlay JAVA animations; setting channel numbers; setting the position, width, and height of the television signal video component within an integrated display; turning the video or audio on or off; freezing or unfreezing the video; setting video brightness, contrast, color, or tint; setting audio volume, balance, bass, and treble; and any other suitable property related to the information presented on television 40.

In addition, control API 60 may include classes that define mapping between channel numbers, identifiers, and associated URLs; associate electronic program guides with channels; represent data streams transmitted in the VBI associated with channels; update the integrated displays presented on television 40 according to changes in content on the associated channels; and perform any other activity associated with the incorporation of television signals into the JAVA environment of platform 12. For example, with respect to updating integrated displays, if a program switches to a commercial break, control API 60 may cause a web page or other Internet information associated with the advertised product to be displayed on television 40 in synchronization with the displayed commercial to provide additional product information or an opportunity to order or comment on the product. URLs and other appropriate information communicated in the VBI may cooperate to allow platform 12 to provide mapping functionality. Control API 60 also includes classes for controlling various operations of recorder 20, for example, starting, stopping, playing, recording, pausing, fast-forwarding, and rewinding. The present invention contemplates any classes suitable to allow control API 60 and platform 12 to support television-related JAVA applets 64 and applications 62, regardless of the content developer or particular operation.

Toolkit 58 may include a datacast API 60 that includes classes to support access to data communicated along with the television signals from source 26, such as Intercast, closed-captioning, Teletext, and other VBI information. A showlet API 60 of toolkit 58 includes classes that support interactive television programming, such as for shopping, advertising, polling, distance learning, participation in game shows, banking, and any other interactive programming. As discussed above, since toolkit 58 and associated APIs 60 of platform 12 support JAVA applets 64 and applications 62 having any appropriate operation, the number of interactive programming opportunities that platform 12 and system 2 provide is virtually limitless. Interactive programming associated with showlet API 60 is discussed more fully in copending U.S. application Ser. No. 08/043,744, which is incorporated by reference herein.

Toolkit 58 also includes an electronic programming guide (EPG) API 60 that contains classes for querying for, retrieving, and manipulating program listing information 6 contained in program listing database 48, constructing and modifying viewer profiles according to viewer preferences, constructing electronic scheduling displays according to viewer profiles and selected program listing information 6, and providing other desirable functionalities that allow viewers to more intelligently select, schedule, and record viewing opportunities. An EPG applet or application 70 that operates using EPG API 60 and other APIs 60 of toolkit 58 in accordance with the present invention is discussed more fully below with reference to FIG. 3. As shown in FIG. 2, JAVA operating system 56 and toolkit 58 implement platform 12 for running JAVA applets 64 and applications 62 in fifth level 59 of hierarchy 50. Although hierarchy 50 is discussed with discrete levels that run on processor 8 of receiver 10, the present invention contemplates one or more levels that are integral to one another or levels that are distributed to run on separate components of receiver 10 or system 2. Interactive television protocols 54, JAVA operating system 56, and toolkit 58 with associated APIs 60 may be referred to collectively as platform 12.

As an example of the operation of APIs 60, consider an EPG applet 70 that is downloaded from the Internet to run on platform 12. In one embodiment, as discussed below with reference to FIG. 3, functionality associated with EPG applet 70 includes recording a television program that is scheduled for broadcast on some unspecified date in the future. After EPG applet 70 is downloaded and begins to run, EPG applet 70 calls EPG API 60 and other APIs 60 as appropriate to accomplish specific tasks. To record a particular program, for example, EPG applet 70 might call a routine associated with EPG API 60 that queries program listing database 48 to determine the air date, start time, stop time, and channel on which the particular program is scheduled for broadcast, passing a program name or other program identifier to EPG API 60. EPG API 60 might then periodically query database 48 until the date of broadcast and the current date are identical. After determining that the program is scheduled for broadcast on the current date, EPG API 60 might call a routine associated with control API 60 that sets recorder 20 to record, passing the start time or other information appropriate for initiating recording of the program. Similar operation might occur to stop the recording or perform any other suitable functionality that EPG API 60 and other APIs 60 of toolkit 58 support. Since the calls from EPG applet 70 to APIs 60 and between APIs 60 are resolved at run time in the JAVA environment associated with platform 12, platform 12 is able to support virtually any appropriate EPG applet 70, which provides an important technical advantage. Although EPG applet 70 is discussed, the above discussion would apply equally to a suitable EPG application 70.

Figure 3:
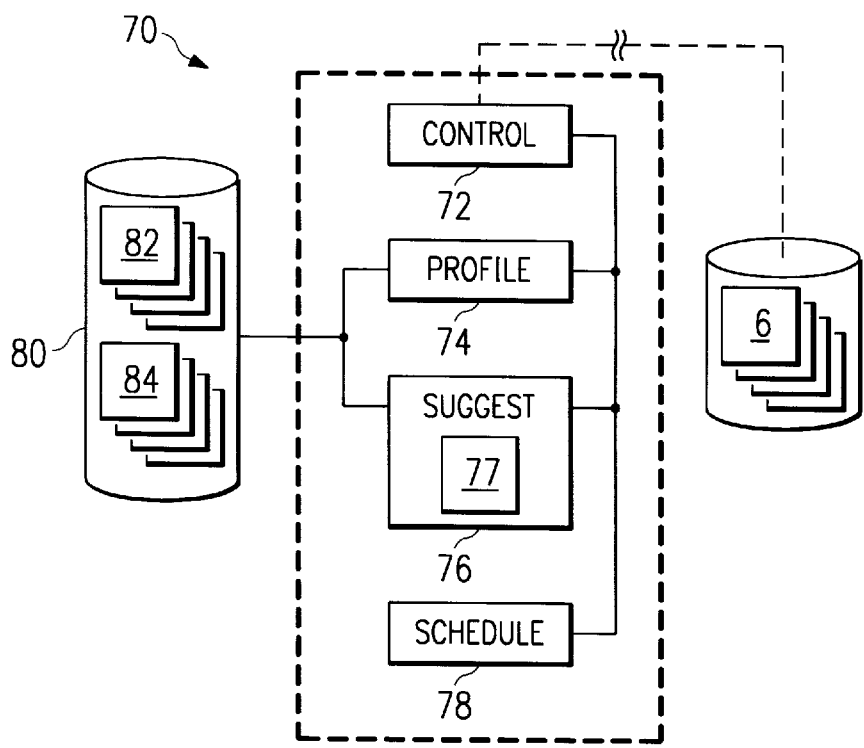
FIG. 3 illustrates an electronic programming guide according to the present invention.

FIG. 3 illustrates JAVA-based electronic program guide (EPG) 70, which may run on platform 12 and processor 8 as a JAVA applet 64 downloaded from the Internet over link 14 or as a JAVA application 62 installed locally on receiver 10 or an associated processing platform. In one embodiment, EPG 70 includes a control module 72, a profile module 74, a suggest module 76, and a schedule module 78 that cooperate to provide various EPG functionalities, as discussed below. According to operation of control module 72, profile module 74, suggest module 76, schedule module 78, and any other appropriate components, EPG 70 uses EPG API 60 to access program listing information 6 in database 48 in cooperation with database server 46, as discussed above with reference to FIG. 1. The present invention contemplates storing program listing information 6 locally at receiver 10 and periodically updating program listing information 6 to replace or combine with accessing database 48 using link 14. In general, EPG 70 allows a viewer to more intelligently select, schedule, and record viewing opportunities according to program listing information 6 and a viewer profile associated with the viewer.

Control module 72 interfaces with the components of platform 12 and system 2 as necessary to retrieve program listing information 6. For example, if program listing information 6 for a particular program is desired, control module 72 might call a routine associated with EPG API 60 to retrieve the desired program listing information 6 in database 48 corresponding to the program, passing suitable information concerning the program and the desired program listing information 6 to EPG API 60. After the appropriate program listing information 6 is returned, control module 72 communicates program listing information 6 to other components of EPG 70, such as profile module 74 or suggest module 76, according to the operation of these components. Control module 72 also coordinates communications between profile module 74, suggest module 76, and schedule module 78 as appropriate. In one embodiment, control module 72 prompts the viewer for and receives a viewer identity in response to the viewer turning on television 40 or in some other manner accessing the resources of EPG 70.

Profile module 74 receives preference information from one or more viewers associated with receiver 10, such as multiple viewers within a family that owns JAVA-enabled television system 2, and constructs, builds, or otherwise generates corresponding viewer profiles 84 for storage in profile database 80. The present invention contemplates each viewer having a separate viewer profile 84, one or more viewers, such as children, having a combined viewer profile 84, or any other suitable arrangement with respect to viewer profiles 84. Furthermore, one or more viewer profiles 84 may be added, deleted, modified, inactivated, reactivated, or otherwise manipulated at any time according to operation of EPG 70. Profile database 80 may include one or more databases, files, lists, or other arrangement of information at one or more locations that are integral to or separate from receiver 10.

In one embodiment, profile database 80 also contains one or more preference templates 82 that profile module 74 may access and communicate to a viewer using control module 72 to receive preference information from the viewer. For example, EPG 70 may communicate one or more preference templates 82 to a viewer in response to the viewer pointing to, clicking on, or otherwise selecting a profile set-up option that EPG 70 displays on television 40 as part of a windowing menu associated with EPG 70. The viewer might then select a particular preference template 82 to begin constructing or modifying viewer profile 84 associated with the viewer. The present invention contemplates viewers interacting with EPG 70 in any suitable manner to select preference templates 82. EPG 70 may also allow the viewer to use input device 42 to hyperlink between templates 82 or viewer profiles 84 displayed on television 40 according to the operation of EPG 70 and particular needs.

Preference templates 82 stored in profile database 80 may include, without limitation: a genre template 82 that lists possible program genres, for example, drama, horror, comedy, romance, or other program genre; an actor template 82 that lists actors that may appear in a program; a sports team template 82 that lists sports teams to which a program may relate in some manner, for example, if the program is an athletic contest, a documentary, or other sports-related programming; a keyword template 82 that lists keywords that may describe the program in some manner, for example, non-stop, heart-warming, exciting, romantic, or other suitable keywords; and any other suitable preference template 82 suitable for constructing viewer profile 84 according to preference information associated with the corresponding viewer. Multiple preference templates 82 may include the same or similar options that result in the viewer providing the same or similar preference information. For example, a viewer might select "educational" as a preference using both genre template 82 and keyword template 82. In one embodiment, options given the viewer in connection with templates 82 correspond to program listing information 6 that database 48 may contain currently or at some point in the future, depending on the particular programs for which database 48 contains program listing information 6 and other suitable factors.

Figures 4, 5:
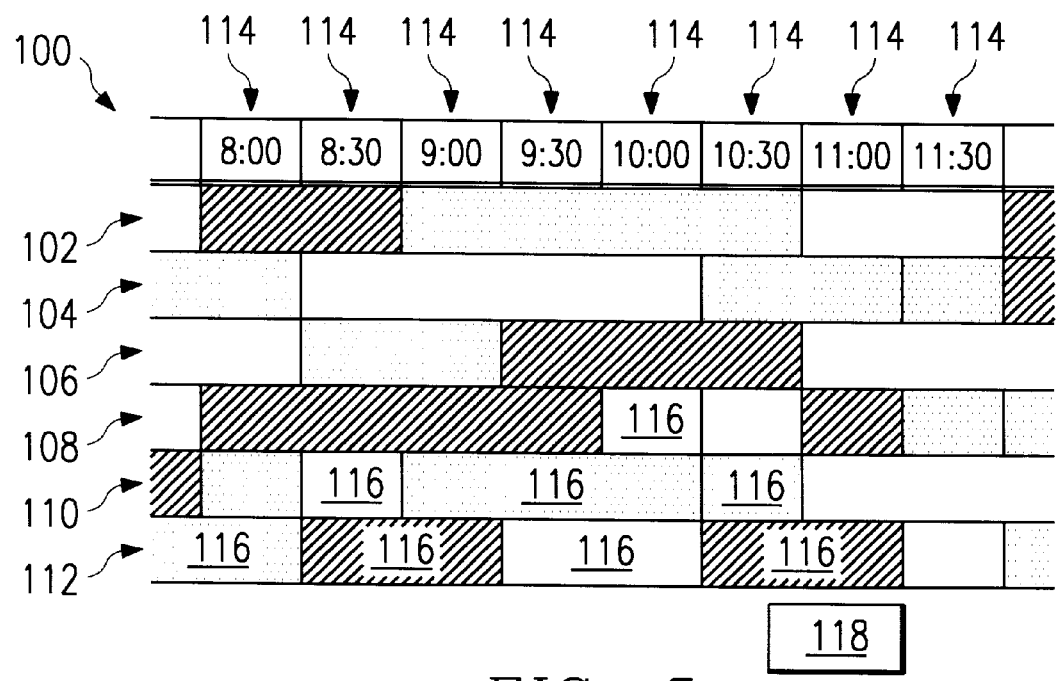
FIG. 4 illustrates an exemplary preference template according to the present invention.
FIG. 5 illustrates an exemplary preferred schedule according to the present invention.

For each option presented to the viewer in connection with preference templates 82, preference templates 82 allow the viewer to provide ranking information that EPG 70 uses to generate viewer profile 84 and provide enhanced viewing opportunities according to viewer profile 84, as discussed more fully below. Referring to FIG. 4, genre preference template 82 includes options 86 and corresponding rankings 88 in any suitable presentation format that is viewable on television 40. In one embodiment, the viewer provides a ranking 88 for each option 86 to indicate the desirability of programming associated with option 86 according to any suitable scale, standard, or other criteria. For example, for each option 86, template 82 might include any number of circles, boxes, or other locations on template 82 that each correspond to a qualitative assessment of the degree to which the viewer will likely enjoy programming associated with option 86.

To provide rankings 88 for options 86, the viewer would simply point to, click on, or otherwise indicate the appropriate locations using input device 42 or in any other suitable manner. Each location may also be associated with a numerical value or weight that quantifies the assessment of the viewer for purposes of scoring programs according to viewer profile 84, as discussed more fully below. For example, if "comedy" option 86 is highly preferable to the viewer, the viewer might indicate the last location to the right in FIG. 4 to provide ranking 88, which might then have a "10" weight. Similarly, if "drama" option 86 is mildly preferable to the viewer, the viewer might indicate the next to last location to the right to provide ranking 88, which might then have a "3" weight. An option 86 with respect to which the viewer is neutral might get ranking 88 with a "0" weight, an option 86 mildly unpreferable to the viewer might receive ranking 88 with a "−3" weight, and an option 86 highly unpreferable to the viewer might receive ranking 88 with a "−10" weight. The present invention contemplates any evaluation or weighting technique suitable to allow viewers to provide rankings 88 for some or all options 86 associated with template 82.

EPG 70 may allow the viewer to hyperlink to displays that provide additional descriptions, examples, or other suitable information by selecting a particular option 86 using input device 82. Genre template 82 may include an exit window 90 allowing the viewer to exit genre template 82 and return to a preference template menu or any other appropriate menu after providing preference information in accordance with genre template 82. Although genre template 82 is discussed, the present discussion applies equally to any other suitable preference templates 82, such as actor template 82, sports team template 82, or keyword template 82. After the viewer has provided preference information to EPG 70 using the appropriate templates 82, profile module 74 stores the preference information for the viewer in profile database 80 as a new or modified viewer profile 84 for the viewer. EPG 70 may generate and store viewer profiles 84 for each viewer associated with system 2, may combine one or more viewer profiles 84 in accordance with particular needs, or may generate viewer profiles 84 in any other manner according to preference information that one or more viewers provide to EPG 70.

Suggest module 76 accesses program listing information 6 in database 48, directly or using control module 72, and viewer profiles 84 in profile database 80 to generate a preferred programming schedule that allows viewers to more intelligently select programs that may be desirable for viewing or recording. FIG. 5 illustrates an exemplary preferred schedule 100 that corresponds to the available television programming between 8:00 p.m. and 12:00 p.m. on a particular date. Preferred schedule 100 includes channel programming 102, 104, 106, 108, 110, and 112 corresponding to first, second, third, fourth, fifth, and sixth channels, respectively, although the present invention contemplates any number of channels. Channel programming 102, 104, 106, 108, 110, and 112 are referred to generally as channel programming 102 unless otherwise indicated. Each program for which preferred schedule 100 has channel programming 102 may fill some or all of one or more time slots 114, which are each thirty minutes long in the example shown in FIG. 5, yielding the brick-like appearance of preferred schedule 100. Button 118 on preferred schedule 118 allows the viewer to hyperlink or establish a connection to a preference template menu or a display of viewer profile 84. Preferred schedule 100 is referred to as including channel programming 102, scoring indicators 116 and program scores used to generate scoring indicators 116, as discussed below, and any other suitable information associated with preferred schedule 100. EPG 70 may temporarily or more or less permanently store preferred schedule 100 at any suitable location.

Using viewer profile 84 and an appropriate scoring algorithm 77, suggest module 76 generates a color coded, numerical, or other scoring indicator 116 for each program for which channel programming 102 and preferred schedule 100 contain programming information. Additional textual or other suitable information concerning the program might be associated with scoring indicator 116. In general, scoring indicator 116 visually indicates to the viewer a degree of desirability likely to be associated with a corresponding program, based on viewer profile 84 for the viewer. For example, scoring indicator 116 may include color or shading that overlays textual information concerning the program, such as bright green for a highly desirable program, pale green for a mildly desirable program, yellow for a program that is not likely to be relatively desirable or relatively undesirable, pale red for a mildly undesirable program, and bright red for a highly undesirable program. Any other suitable color gradations may be used. In the alternative, channel programming 102 for desirable programs might have clear backgrounds for the textual information, channel programming 102 for programs that are neither desirable nor undesirable might have gray backgrounds, and programming information 102 for undesirable programs might be entirely blacked out over appropriate time slots 114. Although the present invention contemplates scoring indicators 116 in any suitable format, in one embodiment the use of coloring provides important technical advantages, as discussed more fully below.

In operation of suggest module 76, control module 72 communicates the viewer identity for the viewer and program listing information 6 for some or all available programs to suggest module 76. In response, suggest module 76 accesses the corresponding viewer profile 84 in profile database 80. For each program, suggest module 76 uses scoring algorithm 77 to generate a program score indicating the desirability of the program to the viewer based on viewer profile 84 and program listing information 6. For example, assume program listing information 6 for a particular program indicated to scoring algorithm 77 that the program genre was comedy, that the program featured actor Bill Cosby, that a keyword associated with the program was "fascinating," and that the program was a closed-captioned rerun starting at 10:00 p.m. and ending at 10:30 p.m. on the current date on the fourth channel. Ranking 88 for "comedy" genre option 86 in viewer profile 84 might be a numeric value, such as "10" or other suitable value, indicating that the viewer strongly prefers comedy programs. Similarly, ranking 88 for "Bill Cosby" actor option 86 might be a "3" or other value indicating that the viewer mildly prefers Bill Cosby programs, and ranking 88 for "fascinating" keyword option 86 might be a "0" or other value indicating that the viewer is neutral regarding programs with which "fascinating" keyword option 86 might be associated.

Still referring to the same example, scoring algorithm 77 might add, average, or otherwise manipulate rankings 88 for the program to determine a score for the program to indicate the degree to which the viewer is likely to enjoy the program, considering all applicable information within program listing information 6 and viewer profile 84, which is likely to be relatively high for this example. In one embodiment, scoring module 77 determines a score for every program for which preferred schedule 100 contains channel programming 102. For programs having scores in a highest percentile range, such as in the highest fifteen percent of scores or any other specified range, suggest module 76 may associate the appropriate colored scoring indicator 116, such as green, clear, or other suitable scoring indicator 116, with the program within preferred schedule 100 to overlay textual information concerning the program. For programs with scores in a middle percentile range, suggest module 76 may associate a yellow, gray, or other scoring indicator 116 with the program. For programs having scores in a lowest percentile range, suggest module may associate red with the program, black out the program and associated textual information from preferred schedule 100, or provide scoring indicator 116 to the viewer in any other manner to indicate relative undesirability of the programs.

According to the particular scoring algorithm 77, the particular scheme for scoring indicators 116, program listing information 6, and viewer profile 84, the viewer is able to consult preferred schedule 100 to intelligently select from among myriad available viewing opportunities. Since preferred schedule 100 is color coded according to the degree to which programs are likely to be enjoyable, the viewer need not have any understanding or knowledge of scoring algorithm 77, the scores determined for any program or the relationship between the scores determined for any collection of programs, or any other aspect of the manner in which suggest module 76 generates preferred schedule 100. The viewer may specify any suitable correspondence between percentile ranges for program scores and the colors used for scoring indicators 116 to customize EPG 70 in accordance with particular needs. Scoring algorithm 77 may be replaced or modified without altering the functionality of EPG 70 from the perspective of the viewer, because the mapping between the desirability of a program and scoring indicator 116 is consistent, such that the viewer always receives channel programming 102 in a format the viewer can readily understand and appreciate.

Referring again to FIG. 5, in time slot 114 between 10:00 p.m. and 10:30 p.m., channel programming 104 for the second channel, channel programming 108 for the fourth channel, and channel programming 112 for the sixth channel all have clear scoring indicators 116, which would overlay textual information for corresponding programs, indicating that the programs on all three of these channels are likely to be enjoyable to the viewer. In contrast, the first, third, and fifth channels have channel programming 102, 106, and 110, respectively, having gray or black scoring indicators 116, as the case may be, which indicates that programs on these channels during this time slot 114 are not likely to be enjoyable to the particular viewer. As a result, if the viewer consults preferred schedule 100 with respect to this time slot 114, the viewer can readily make a determination regarding the channels to select, providing an important technical advantage. In addition, preferred schedule 100 allows the viewer to make more intelligent decisions concerning which time slots 114 are likely to be most suitable for enjoyable viewing in accordance with the arrangement of scoring indicators 116. For example, if the concentration of clear scoring indicators 116 for desirable programs is relatively high in one or more time slots 114, the viewer may plan viewing times for the viewer or other viewers within the household accordingly.

In one embodiment, EPG 70 allows the viewer to point to, click on, or otherwise select channel programming 102 for a particular program to hyperlink or establish any suitable connection to a display that provides additional factual, descriptive, or other information relating to the program, the associated program listing information 6, the score that scoring algorithm 77 generated for the program, the percentile rank or range for the program associated with the program score, or any other suitable information, in any combination. EPG 70 may allow the viewer to further hyperlink from this display to other displays providing further information concerning selected program listing information 6. For example, if the first display for the program includes a list of actors appearing in the program, the viewer may point to, click on, or otherwise select the name of an actor to hyperlink or establish a connection to a second display providing biographical information for the actor, other programs in which the actor appears, or any other suitable information concerning the actor. EPG 70 may allow the viewer to point to, click on, or otherwise select a particular time slot 114 to receive the program score and other information for some or all programs airing within at least a portion of time slot 114, in descending order from highest to lowest score or any other suitable order. The present invention contemplates any technique for providing the viewer with access to program-related information to allow the viewer to select program viewing and recording opportunities more intelligently to enhance the television-related experience. The viewer may provide an appropriate URL at any time to access the information discussed above from Internet information sources, such as a web page associated with an actor or program.

Furthermore, EPG 70 allows the viewer to change from one channel, whether or not the channel is currently airing a relatively desirable program, to another channel that is currently airing a relatively desirable program at any time during a viewing session. In one embodiment, the viewer presses the "channel up" button or otherwise provides an indication using input device 42 that the viewer wishes to change channels. In response, EPG 70 changes to another channel, for example, the channel airing the program having the highest score relative to the other programs currently airing on other channels, while bypassing channels that are not currently airing a program satisfying the preferences of the viewer currently in effect. Since the viewer can modify the corresponding viewer profile 84 at any time or can select a particular program at any time according to preferences the viewer may provide at any time, the viewer need not consult any printed programming guides to make a viewing decision, which is an important technical advantage of the present invention.

For example, referring again to preferred schedule 100 in FIG. 5, if the viewer is currently viewing a program on the first channel during time slot 114 between 10:00 p.m. and 10:30 p.m. and presses the "channel up" button on input device 42, EPG 70 would cause receiver 10 to tune to the sixth channel currently airing a program that is likely to be desirable, as indicated by the clear scoring indicator 116 associated with channel programming 112 for the sixth channel during time slot 114. Similarly, if the viewer again presses the "channel up" button, EPG 70 would cause receiver 10 to tune to the fourth channel, which is also airing a program having a clear scoring indicator 116. In this manner, the viewer is able to bypass the program airing on the fifth channel, which is not as likely to be enjoyable to the viewer, as indicated by the gray scoring indicator 116 associated with channel programming 110 for the fifth channel.

EPG 70 may also use additional criteria specified by the viewer or otherwise in determining which channel to tune to in response to an indication from the viewer that a channel change is desired. For example, if more than one channel is airing a program with a clear scoring indicator 116 during time slot 114, EPG 70 may cause receiver 10 to tune to the channel airing the program that started most recently. In this case, for the 10:00 p.m. to 10:30 p.m. time slot 114, the fourth channel would be tuned to first, the sixth channel second, and the second channel third. EPG 70 may use other information to determine which channel to select, for example, the channel airing the program with the highest score, the channel airing a program that is not a rerun, or any other information. The present invention contemplates any suitable technique for selecting one or more alternative channels for viewing at any time during a viewing session.

Since EPG 70 performs a channel selection process that is program-based rather than channel-based, the selection process dynamically adapts as programs aired on the various channels change. For example, during time slot 114 between 10:30 p.m. and 11:00 p.m., EPG 70 might still preferentially tune receiver 10 to the fourth channel, but would not tune to the sixth channel for which channel programming 112 now includes a black scoring indicator 116 corresponding to a low likelihood that the viewer will enjoy the program. EPG 70 may preferentially select channels for viewing during time slot 114 according to any appropriate combination of program listing information 6 retrieved from database 48 using EPG API 60, link 14, and database server 46.

EPG 70 also allows a viewer to control viewing habits and opportunities for other viewers, such as children in a household, due to the program-based nature of EPG 70 and the functionality that EPG 70 provides. In one embodiment, the parent may filter, block, or otherwise prevent a child from viewing a particular program or type of program that has associated program listing information 6 satisfying a predetermined criterion or set of criteria. For example, if the parent wanted to prevent the child from viewing any program of the "horror" genre, the parent could enter the corresponding preference information using profile module 74 or otherwise, and the child might be required to provide identity information to EPG 70 to access television 40 when the parent was not present. If the child accessed system 2 while HOME BOX OFFICE was airing *Halloween*, EPG 70 would not allow the child to tune to the channel corresponding to HOME BOX OFFICE at that time, but would later permit the child to tune to the same channel while HOME BOX OFFICE was airing The Sound of Music or other relatively preferable programming. The parent could also limit the total daily viewing of the child with respect to programs with program listing information 6 satisfying selected characteristics entered using profile module 74 or otherwise. For example, the parent might use EPG 70 to limit the daily viewing of programs of the "cartoon" genre to two hours, after which EPG 70 would not allow the child to select a channel that was currently airing a program of that genre. The program-based nature of EPG 70 provides an important technical advantage over previous systems for providing programming information.

Another important technical advantage of the present invention involves the ability to record programs using recorder 20 in accordance with viewer profiles 84, program listing information 6, or both viewer profiles 84 and program listing information 6, without relying on the viewer to provide information concerning air dates, start times, stop times, or channels for the programs, referred to collectively as broadcast information. Since EPG 70 has access to the resources of database 48 and program listing information 6, if the viewer provides EPG 70 with the title or another suitable identifier for a program, EPG 70 can use EPG API 60 and other components of platform 12 and receiver 10 to cause recorder 20 to record the program regardless of the date, time, or channel on which the program will air. For example, if the viewer specifies recording of all episodes of M*A*S*H or another series, EPG 70 will cause M*A*S*H to be recorded even if the channel airing M*A*S*H changes, the time at which M*A*S*H is aired changes, or the length of the M*A*S*H program changes because the program is a season premiere or for any other reason, because EPG 70 continues to maintain access to the appropriate program listing information 6 in database 48. Eliminating the need for the viewer to provide broadcast information is an important technical advantage.

Similarly, the viewer can cause recorder 20 to record all programs associated with particular keyword or other options 86, such as "James Bond" or another suitable keyword option 86, specify that reruns of a program that is otherwise to be recorded are not to be recorded, or specify the recording of programs in any other suitable manner using EPG 70. Scoring algorithm 77 of suggest module 76 may also determine scores for each program available to be recorded according to program listing information 6 and an appropriate profile 84 stored in profile database 80. If the score for a particular program exceeds a predetermined threshold specified by the viewer or otherwise, EPG 70 may cause the program to be recorded even though the viewer had no knowledge that the program would be airing or even that the program existed. EPG 70 may record programs using one or more recorders 20. For example, if recorders 20 are VCRs and EPG 70 supports multiple viewer profiles 84, EPG 70 may cause a program that is relatively desirable for a particular viewer according to associated viewer profile 84 to be recorded using recorder 20 corresponding to the particular viewer. The recording of programs may be periodically modified by inactivating or removing selected viewer profiles 84 from database 80 in accordance with particular needs.

Schedule module 78 of EPG 70 provides a conventional programming schedule in accordance with program listing information 6, but does not include information concerning viewer preferences or other information associated with or determined according to viewer profiles 84. For example, a viewer may point to, click on, or select schedule module 78 using a menu display associated with EPG 70 or in any other suitable manner. In response, EPG 70 may display channel information 102 for various channels over one or more time slots 114, as shown in FIG. 5 and discussed above with reference to preferred schedule 100, except that scoring indicators 116 are absent from the programming schedule. The present invention contemplates combining the programming schedule associated with schedule module 78 and preferred schedule 100 associated with suggest module 76 in any appropriate manner. Although EPG 70 is discussed with respect to platform 12, the present invention contemplates EPG 70 running on any platform suitable to support JAVA-based operation of EPG 70. The present invention further contemplates one or more modules of EPG 70 being integral to one or more other modules or distributed to operate on processing platforms external to platform 12.

Figure 6:
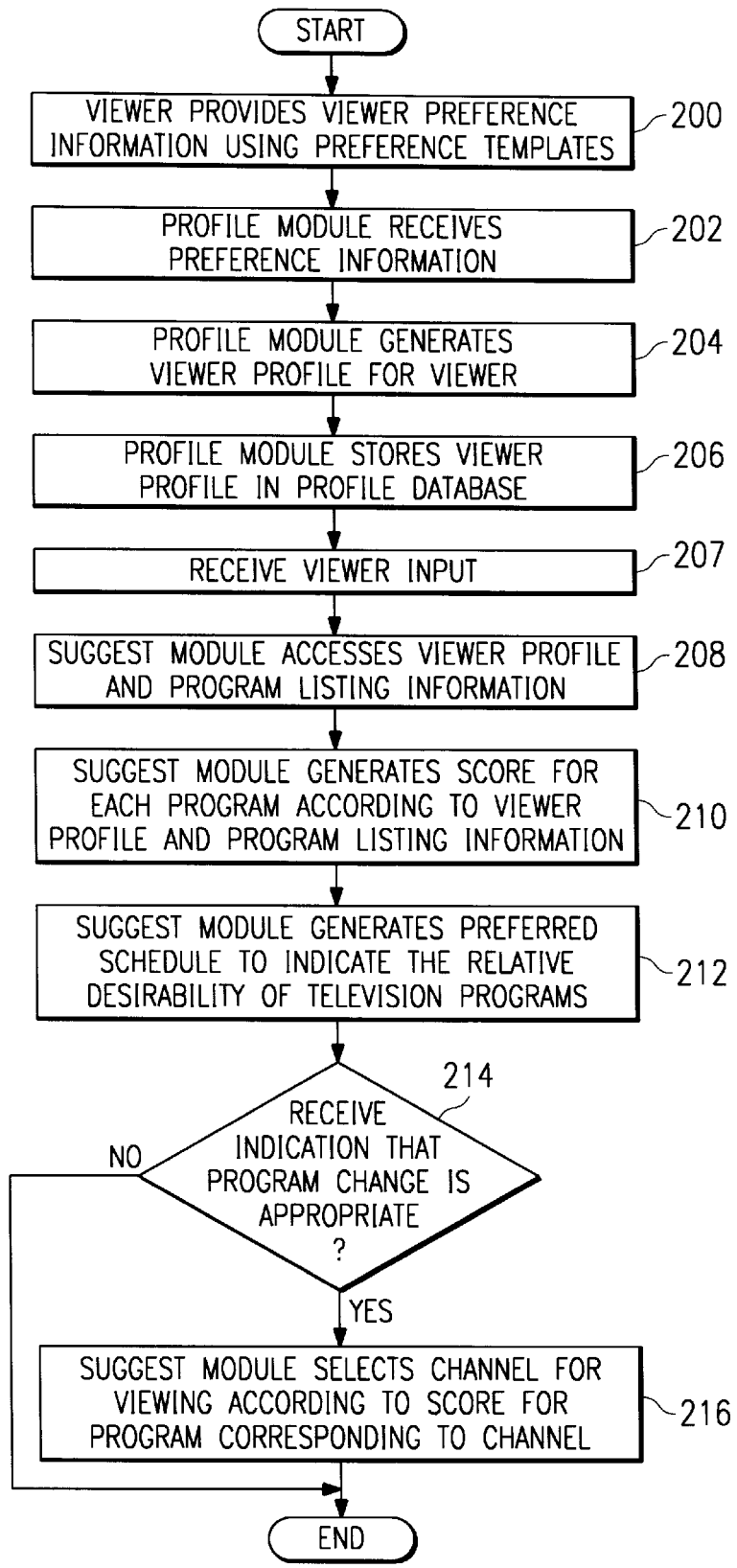
FIG. 6 is a flow chart illustrating an exemplary method for selecting a program for viewing according to the present invention.

FIG. 6 is a flow chart illustrating an exemplary method for selecting a program for viewing according to the operation of EPG 70. The method begins at step 200, where the viewer provides viewer preference information to EPG 70 using one or more preference templates 82 and input device 42 or in any other manner. At step 202, profile module 74 receives the viewer preference information, either directly or through control module 72, in the form of rankings 88 corresponding to preference options 86. As discussed more fully above, options 86 may include genre options 86, actor options 86, sports team options 86, keyword options 86, or any other suitable options 86. Profile module 74 generates viewer profile 84 for the viewer at step 204 and, at step 206, stores viewer profile 84 in profile database 80. In one embodiment, viewer profile 84 includes rankings 88 for each preference option 86 to provide an indication of the relative desirability to the viewer of programming that is associated with the particular option 86. Suggest module 76, control module 72, or another suitable component of EPG 70 receives viewer input at step 207, which may include the viewer turning on television 40, accessing EPG 70 in some manner, or otherwise indicating that the viewer wishes to view television programming.

At step 208, suggest module 76 accesses viewer profile 84 in profile database 80 and program listing information 6 in program listing database 48, in cooperation with EPG API 60, link 14, and database server 46. Suggest module 76 may access one or more local databases periodically updated to contain program listing information 6 to replace or combine with accessing database 48. Suggest module 76 may access program listing information 6 for all programs airing on a particular date, within one or more time slots 114, or any other set of programs. At step 210, suggest module 76 and associated scoring algorithm 77 calculate, determine, or otherwise generate a program score for each program according to viewer profile 84 and program listing information 6. At step 212, suggest module 76 generates preferred schedule 100 having channel programming 102 for appropriate time slots 114. In one embodiment, a scoring indicator 116 is associated with each program for which preferred schedule contains channel programming 102, in the form of a color overlaying textual information concerning the program or in any other format.

Suggest module 76 may receive an indication at step 214 that a program change is appropriate. For example, the indication may include the viewer pressing a "channel up" button on input device 42 or providing any other suitable indication. Alternatively, if the viewer is a child, the parent may have instructed EPG 70 to prevent the child from viewing programming of a particular genre. The indication may include the child selecting a channel currently airing a program having the undesirable genre or the ending of a desirable program airing on a channel that subsequently begins to air a program having the undesirable genre. If the indication is received at step 214, suggest module 76 selects a program at step 216 that is more likely to be desirable, according to program scores for the other programs for which preferred schedule 100 contains channel programming 102, and the method ends. If the indication is not received at step 214, viewing continues as before and the method ends. Steps 200 through 216 may be repeated as many times and in any relative order as appropriate to allow viewers to modify viewer profiles 84, to select an alternative program for viewing during a viewing session, or to otherwise implement any of the functionalities that EPG 70 supports.

Figure 7:
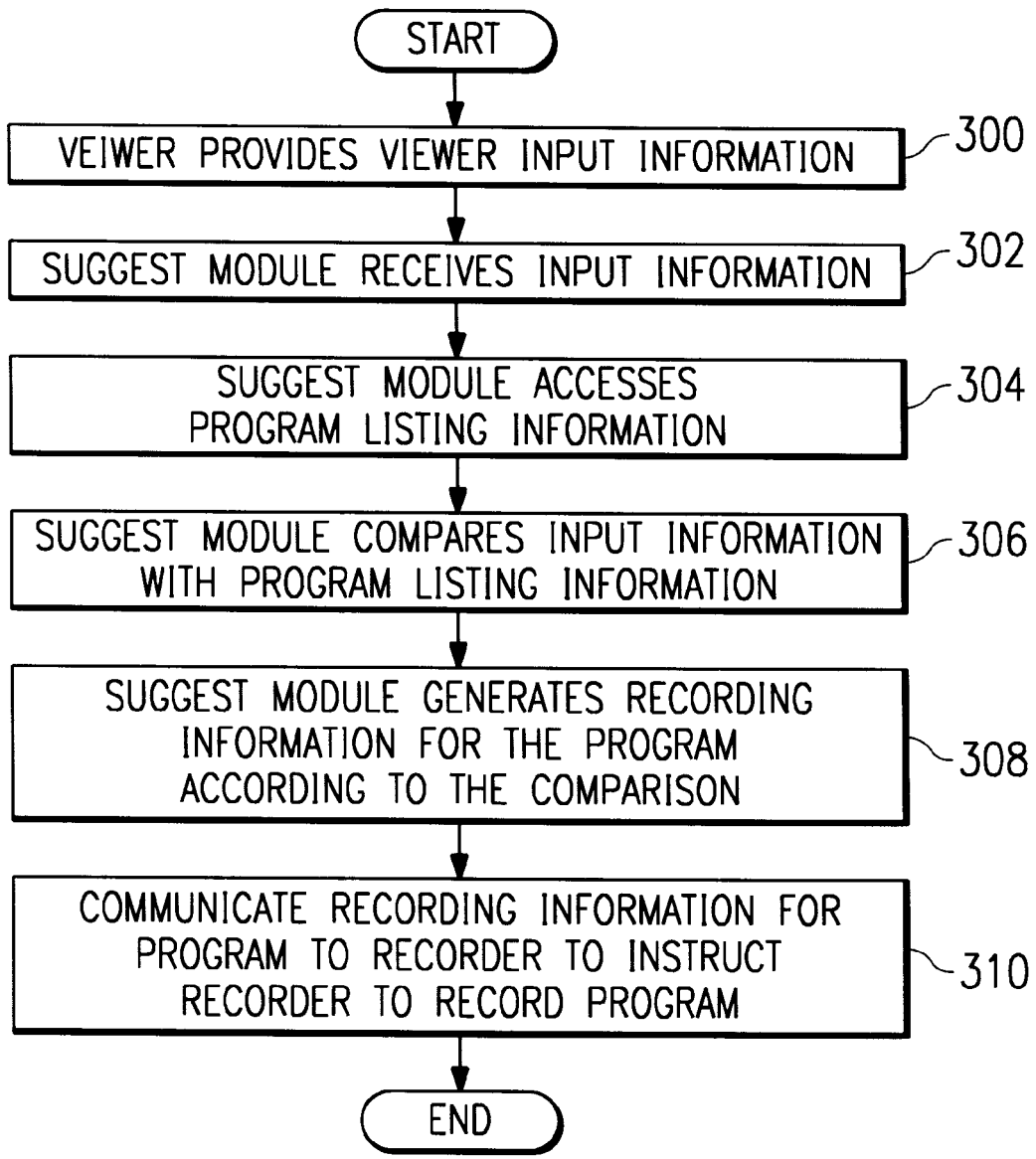
FIG. 7 is a flow chart illustrating an exemplary method for recording a television program according to the present invention.

FIG. 7 is a flow chart illustrating an exemplary method for recording a television program according to the operation of EPG 70. The method begins at step 300, where the viewer provides viewer input information to EPG 70. In one embodiment, the input information may include a program identifier for the program to be recorded, such as a title for the program, any preference option 86 discussed above, or any combination of a program identifier and one or more preference options 86. Since EPG 70 is program-based, the input information need not include broadcast information, such as an air date, start time, stop time, or channel. Since EPG 70 is able to cause recorder 20 to record any program using a program identifier for the program, without information from the viewer regarding the air date, start time, stop time, or channel, preference information may not be necessary. In the alternative, the viewer may instruct EPG 70 to cause recorder 20 to record all previously unidentified programs satisfying viewer profile 84, in which case input information would include at least some viewer preference information. Suggest module 76 receives the input information at step 302, directly or through control module 72 or any other suitable component of EPG 70.

Suggest module 76 accesses program listing information 6 at step 304 stored locally or in database 48 using EPG API 60, link 14, and database server 46. At step 306, suggest module 76 compares the input information, such as the program identifier or viewer profile 84 generated using the preference information for the viewer, with program listing information 6 in database 48. In accordance with the comparison performed at step 306, suggest module 76 generates recording information for the program at step 308. For example, if a program for which database 48 contains program listing information 6 satisfies a predetermined threshold score associated with viewer profile 84, then suggest module 76 may generate the recording information for the program to cause the program to be recorded.

The recording information may include any instruction or set of instructions suitable to cause recorder 20 to record the program, such as an air date, start time, stop time, channel, or other information relating to the airing of the program. The present invention contemplates the recording information being an instruction to EPG API 60, control API 60, or another component of platform 12 to initiate recording of the program. At step 310, suggest module 76, control module 72, or another component of EPG 70 communicates the recording information for the program to EPG API 60, control API 60, or any other appropriate component of platform 12 or system 2 to instruct recorder 20 to record the program, and the method ends. The present invention contemplates the steps illustrated in FIGS. 6 and 7 cooperating in any suitable manner to allow one or more viewers to more intelligently select, schedule, and record viewing opportunities according to operation of EPG 70 and system 2.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. An electronic programming guide operable to run on a computing platform that is associated with a television, the computing platform operable to access a program listing database containing program listing information for a plurality of television programs, the electronic programming guide comprising:

a profile database operable to store a viewer profile; and a suggest module coupled to the profile database, the suggest module operable to access the viewer profile and the program listing information and, in response, to generate a preferred schedule according to the viewer profile and the program listing information, the preferred schedule operable to indicate the desirability of a particular program relative to other programs;

the suggest module comprises a scoring algorithm operable to generate a preference score for the program according to the viewer profile and the program listing information;

the suggest module is further operable in response to viewer's requests for a channel change to select a channel for viewing according to the preference score for the program while bypassing channels that are not currently airing a program satisfying the preferences of the viewer in effect.

2. A method performed on a computing platform that is associated with a television for providing functionality associated with an electronic programming guide, the method comprising:

storing a viewer profile in a profile database;

accessing the viewer profile in the profile database and program listing information stored in a program listing database for a plurality of television programs;

generating a preferred schedule in accordance with the viewer profile and the program listing information, the preferred schedule operable to indicate the desirability of a particular program relative to other programs;

generating a preference score for the program according to the viewer profile and the program listing information; and selecting a channel in response to viewer's request for channel change for viewing channels according to the preference score for the program while bypassing channels that are not currently airing a program satisfying the preference of the viewer in effect.

* * * * *